United States Patent [19]
Kowatari et al.

[11] Patent Number: 5,832,403
[45] Date of Patent: Nov. 3, 1998

[54] AIR FLOW MEASURING APPARATUS AND METHOD THEREOF

[75] Inventors: Takehiko Kowatari, Chiyoda-machi; Nobukatsu Arai, Ushiku; Kaoru Uchiyama, Omiya-machi; Chihiro Kobayashi; Shinya Igarashi, both of Naka-machi, all of Japan

[73] Assignee: Hitachi, Ltd., Tokyo, Japan

[21] Appl. No.: 766,615

[22] Filed: Dec. 13, 1996

[30] Foreign Application Priority Data

Dec. 13, 1995 [JP] Japan .................................. 7-324212

[51] Int. Cl.⁶ .................................................. G01M 15/00
[52] U.S. Cl. .......................... 701/103; 73/118.2; 340/439; 340/451
[58] Field of Search ........................... 73/115, 116, 117.2, 73/117.3, 118.2, 118.1; 340/439, 451; 364/431.03, 431.051; 701/101, 103

[56] References Cited

U.S. PATENT DOCUMENTS

| | | | |
|---|---|---|---|
| 5,092,164 | 3/1992 | Matsuoka et al. | 73/118.2 |
| 5,228,336 | 7/1993 | Nagaishi | 73/118.2 |
| 5,241,857 | 9/1993 | Schnaibel et al. | 73/118.2 |
| 5,317,910 | 6/1994 | Steinbrenner et al. | 73/118.2 |
| 5,339,680 | 8/1994 | Bronkal et al. | 73/118.2 |
| 5,544,523 | 8/1996 | Uchiyama et al. | 73/118.2 |

FOREIGN PATENT DOCUMENTS

| | | |
|---|---|---|
| A-59-17371 | 4/1984 | Japan . |
| A-61-213728 | 9/1986 | Japan . |
| A-2-32564 | 7/1990 | Japan . |
| A-4-358743 | 12/1992 | Japan . |
| A-5-10612 | 2/1993 | Japan . |
| A-6-13859 | 2/1994 | Japan . |

OTHER PUBLICATIONS

W. Follmer, "Frequency Domain Characterization of Mass Air Flow Sensors", SAE Paper No. 880561, pp. 111–119.

E. Hendricks, et al., "Conventional Event Based Engine Control", SAE Paper No. 940377, pp. 145–164.

Primary Examiner—George M. Dombroske
Attorney, Agent, or Firm—Antonelli, Terry, Stout & Kraus, LLP

[57] ABSTRACT

A digital signal obtained by A/D converting an output of a thermal type air flow meter is supplied along two paths. After a time constant is obtained in one path, inverse-transformation is performed to obtain an error together with an output of the other path. The inverse-transformed signal is linearized on the basis of the characteristic of the thermal type air flow meter, and a direction of flow is determined.

12 Claims, 13 Drawing Sheets

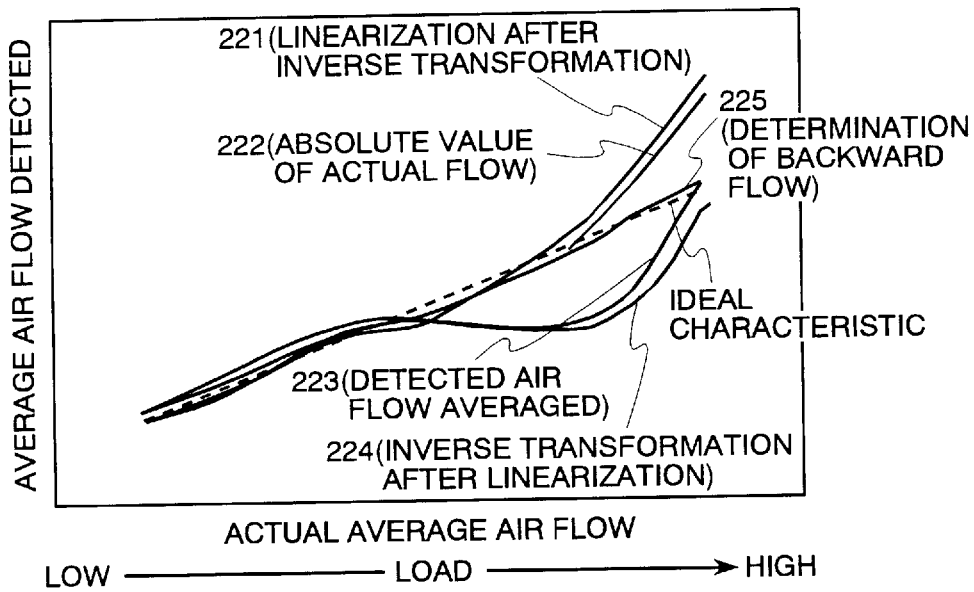
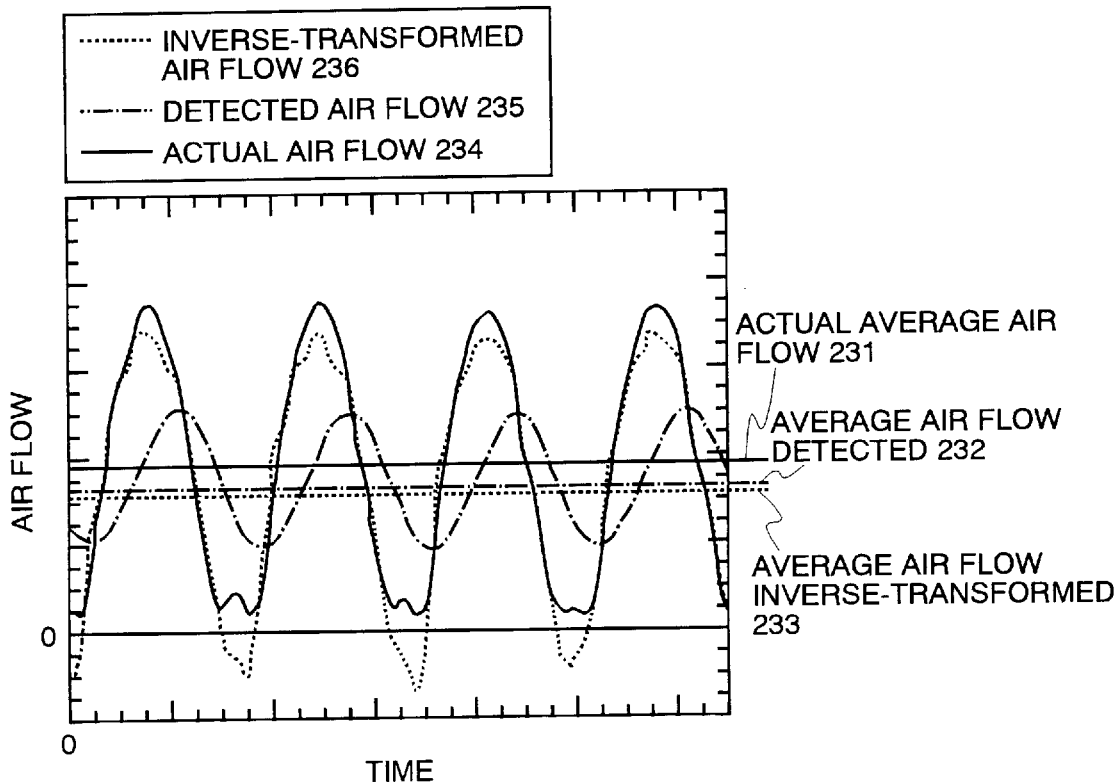

AIR FLOW MEASURING APPARATUS AND METHOD THEREOF

BACKGROUND OF THE INVENTION

The present invention relates to an air flow measuring apparatus and method for use in an electronic fuel injection system of an internal combustion engine for automobiles.

Most thermal type air flow meters for measuring an amount of intake air flowing into the engine of an automobile are provided upstream of the throttle valve in the air intake duct. In a case where the opening of the throttle valve is large, that is, when the load of the engine is large, a pulsating flow is produced in the air intake duct. Therefore, if an air flow sensor having a slow response characteristic is used, a signal indicative of an abnormally decreased air flow may be detected. The cause of the decrease mainly depends upon the response of the sensor being used and the nonlinear output characteristic thereof. It is, therefore, possible to avoid the problem by using a linearizer having a fast response characteristic, such as a thin thermal wire. An example of such an arrangement is disclosed in Japanese Patent Publication No. 59-17371 (1984) (hereinafter referred to as Document 1), in which a decrease in the air flow being detected can be overcome by detecting the amplitude of the pulsating output, multiplying it by a coefficient for correction, and adding the result to an average output.

A basic concept concerning a method of correcting an output of a thermal type air flow meter is described in SAE paper No.880561 (hereinafter referred to as Document 2) and SAE paper No.940377 (hereinafter referred to as Document 3). The concept set forth in these documents is based upon the fact that the output of the thermal type air flow meter has a delay in the time of response and a non-linear response characteristic. Examples of a thermal type air flow meter constructed on the basis of such a concept are disclosed in Japanese Patent Publication No. 6-13859 (1994) (hereinafter referred to as Document 4) and Japanese Patent Application Laid-Open No. 4-358743 (1992) (hereinafter referred to as Document 5).

Further, because it is impossible to determine the direction of air flow in a thermal type air flow meter, the trend has been for the detected air flow to increase abnormally in the measurement of a pulsating flow including a backward flow. Such a pulsating flow including a backward flow results from a reflection of a pulsating pressure due to operation of the air intake valve, and/or blow-back due to the overlap of timing of the opening of the intake and exhaust valves of the engine. There is disclosed a method of detecting an amount of the backward flow of air by using a thermal type air flow meter that can not determine the direction of air flow in Japanese Patent Publication No.2-32564 (1990) (hereinafter referred to as Document 6), Japanese Patent Publication No.5-10612 (1993) (hereinafter referred to as Document 7), and Japanese Patent Application Laid-Open No.61213728 (1986) (hereinafter referred to as Document 8).

In the thermal type air flow meter described in Documents 4 and 5, the output of the thermal type air flow meter is linearized, and then the lineared output is inverse-transformed to compensate its response. While the extent of the fluctuation of the air flow can be corrected to a certain extent by using such an apparatus, it is impossible to obtain an actual measurement of average air flow, which is important to determine the air/fuel ratio of the engine.

In the air flow meter described in Document 5, an inverse-transformation is performed to compensate the response, thereby obtaining an error and providing a gain to the error. It is, therefore, possible to correct the decrease in the average air flow. However, as described in Document 1, the decrease in the average air flow is caused by the deterioration of the response and/or the nonlinear output, both of which have a characteristic which depends upon the air flow. Accordingly, it is necessary suitably to change it according to the frequency and the amplitude of the pulsating flow and the average air flow. More concretely, it is required to use a complicated map of stored values.

A thermal type air flow meter can not detect the direction of the air flow, and so it tends to erroneously detect a backward flow as a forward flow (the direction of flow into the engine). As a result, an increase in the detected air flow often occurs. This problem can be solved by distinguishing the backward flow from the forward flow and accumulating them after setting the backward flow as a negative value (−) and the forward flow as a positive value (+). Namely, because the backward air flow can be derived from air previously flowing in a forward direction, the actual average air flow can be obtained by integrating and averaging the air flow with a sign with respect to time. The above-described method is disclosed in more detail in Documents 6, 7 and 8.

In Document 6, the phase of the crank angle at which the backward flow occurs is preset, and the air flow is regarded as a backward flow when the crank angle reaches the phase. However, in actual practice, the backward flow does not always occur in the air intake duct of the internal combustion engine. In this regard, the phase at which the backward flow occurs may vary according to the load and the rotational speed of the engine. Therefore, there is the possibility of subtracting what is assumed to be a backward flow even if there is no backward flow. Further, if the phase at which the backward flow occurs is preset, it is impossible to obtain a correct measure of the backward flow due to the delay in the time of response of the thermal type air flow meter.

Further, in the method described in Document 7, the starting point of the backward flow is determined by measuring the pressure in the air intake duct at the same time. However, also in this method, the air flow detected during the period of occurrence of the backward flow is different from the actual air flow due to the delay in the time of response of the thermal type air flow meter. Accordingly, it is impossible to correctly detect the backward flow.

A method to solve the problem discussed in Documents 6 and 7 is disclosed in Document 8, in which there is described a method to pick up the period of the backward flow from the output of the thermal type air flow meter mainly to improve the effect of noise. It is assumed that the direction of flow has changed when specific points obtained by comparing sampled outputs with a setpoint appear continuously below and above the setpoint. It is, therefore, possible in this way to determine the period of the backward flow. However, because the setpoint varies from moment to moment according to the load and the rotational speed of the engine, the construction of the apparatus becomes complicated and the operation thereof also becomes complicated.

As described above, the average air flow which is detected often decreases below the actual air flow when the average pulsating flow is detected by the thermal type air flow meter. In such a case, it is difficult to obtain the actual average air flow even if an inverse-transformation is performed on the signal which passes through the linearizer, because the delay in the time of response is not considered in the prior art.

SUMMARY OF THE INVENTION

An object of the present invention is to provide an improved air flow measuring apparatus and method, in which it is possible to obtain a measurement value corresponding to the actual air flow, even if a pulsating flow into an engine is measured by a thermal type air flow meter having a delay in its time of response.

Another object of the present invention is to provide a simple air flow measuring apparatus and method which can measure air flow with a high accuracy.

In a first mode of the present invention, an air flow measuring apparatus for measuring an amount of intake air flowing into an internal combustion engine by using an output signal of a thermal type air flow meter, comprises correcting means responsive to an output signal of the thermal type air flow meter for correcting a delay in the time of response thereof, and linearizing means responsive to an output signal of the correcting means for converting the output signal into a signal with a value corresponding to an air flow rate on the basis of characteristics of the thermal type air flow meter stored in advance.

Preferably, the air flow measuring apparatus further comprises backward air flow determining means responsive to an output signal of the linearizing means for determining the backward flow of air.

In a second mode of the present invention, an air flow measuring apparatus for measuring an amount of intake air flowing into an internal combustion engine by using an output signal of a thermal type air flow meter, comprises an A/D converter for sampling the output signal of said thermal type air flow meter to produce a digital signal, and linearizing means in which the digital signal produced in the A/D converter flow into first and second circuits, the digital signal being inverse-transformed to obtain an error signal from an output signal corresponding to actual air flow in the first circuit, the inverse-transformed digital signal being added to a digital signal of the second circuit, and the resulting signal being converted into a signal with a value corresponding to air flow on the basis of characteristics of the thermal type air flow meter stored in advance.

Preferably, an air flow measuring apparatus further comprises backward air flow determining means responsive to an output signal of the linearizing means for determining the backward flow of air.

Further preferably, in the air flow measuring apparatus the backward flow determining means comprises first comparing means for comparing an output signal corresponding to the air flow obtained by the linearizing means with a predetermined threshold value, a plurality of integrating means for inputting and then storing a value in accordance with an output signal from the first comparing means, second comparing means for comparing output signals from two integrating means out of said plurality of integrating means, and sign adding means for adding exclusively a positive or a negative sign to the output signals from the two integrating means in accordance with an output of the second comparing means.

Further, the air flow measuring apparatus comprises first switching means for allowing an output of the first comparing means to be input to the same integrating means when the output of the first comparing means is continuously more than a predetermined threshold value.

It is also preferable that the backward flow determining means comprises first comparing means for comparing the signal corresponding to the air flow rate with a predetermined value, first and second integrating means for inputting and integrating the signal throughout the period of time during which the signal is continuously more than the predetermined value, switching means for switching alternately the time period for integration to the first and the second integrating means, and sign adding means for adding a negative sign to the smaller one of the outputs of the first and the second integrating means.

Further preferably, the air flow measuring apparatus further comprises signal detecting means for detecting a signal in synchronization with rotation of a crank shaft of the engine, wherein the integrating time of the integrating means is set to an interval of the detected signal.

In another aspect of the present invention, a method of measuring an amount of intake air flowing into an internal combustion engine by using an output signal of a thermal type air flow meter, comprises the steps of sampling an output of said thermal type air flow meter, determining a time constant from the sampled signal, inverse-transforming the output signal into an air flow signal by using the time constant, linearizing the inverse-transformed signal, and determining backward air flow, thereby determining the amount of the intake air.

Preferably, in the air flow measuring method, a direction of flow of a second unit subsequent to a first unit is opposite in direction to the first unit, when it is assumed that the period of time, during which the magnitude of the signal corresponding to an amount of the air flow obtained on the basis of the sampled data is continuously more than the predetermined value, is defined as a unit in the step of determining the backward flow.

Further preferably, in the air flow measuring method, the linearized output signals in the odd units during the predetermined period of time and the linearized output signals in the even units are integrated independently of each other, the magnitude of the integrated values are compared with each other, and the backward flow is determined by the output signal with the smaller value.

Further preferably, the air flow measuring method further comprises a step of detecting a signal in synchronization with rotation of a crank shaft of the engine, wherein the integrating time is set to an interval of the detected signal.

Further preferably, the integrating time is set to a value between 0.1 ms and 2 ms. It is also preferable that the integrating time is set to the period of time during which the crank angle of the internal combustion engine shifts between 0.60° and 12°.

Further preferably, sampling is periodically performed, and the period can be changed according to the rotational speed of the internal combustion engine.

BRIEF DESCRIPTION OF THE DRAWINGS

FIG. 2 is a graph showing the relationship between the average air flow obtained by inverse-transformation and the actual average air flow measured under conditions in which the load of an internal combustion engine is varying and the rotational speed thereof is constant.

FIG. 3 is a graph showing the relationship between the waveform of the actual air flow and the waveform of the air flow which has been inverse-transformed by using the prior art method.

PREFERRED EMBODIMENTS OF THE INVENTION

Embodiments of the present invention will be explained hereinafter with reference to the attached drawings.

Firstly, the basic operation of the present invention will be described. As described in the aforementioned Document 1, there is no fear of a decrease in the detected air flow obtained by applying the output signal of a thermal type air flow meter with a fast response to a linearizer and averaging an output of the linearizer, even if the air flow to be measured is pulsating.

Figure 5:
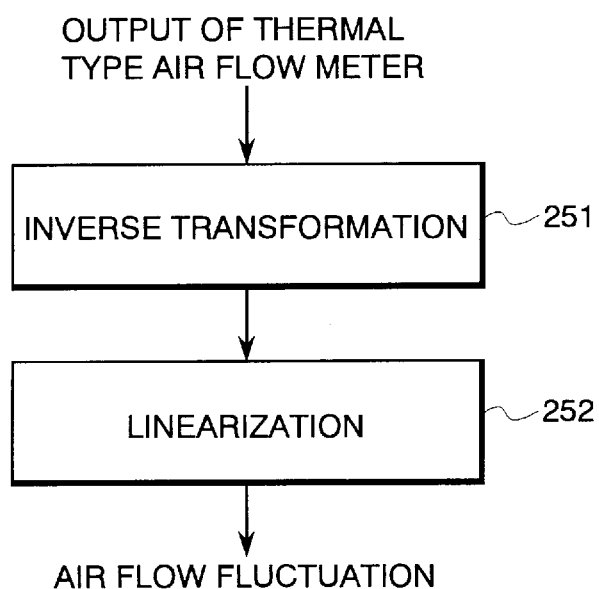
FIG. 5 is a flow chart of the processing of inverse-transformation in an embodiment of the present invention.

On the other hand, since an air flow meter with a slow response and with a non-linear characteristic has a delay in its response (which means the amplitude is lessened and the phase is delayed), the value of the air flow being detected is decreased. Accordingly, as shown in FIG. 5, it is necessary to inverse-transform the output of the thermal type air flow meter so as to compensate its response (step 251), and then linearize the result using a linearizer (step 252) in order to obtain a correct measure of actual air flow from the output of the thermal type air flow. Here, the inverse-transformation refers to a processing in which the amplitude and the phase are corrected to recover the signal having a delay in its time of response.

In other words, while the inverse-transformation to compensate the response has the functions to lead the phase and to increase the amplitude, it does not have the function to amplify the average value. It is, therefore, possible to obtain substantially the same signal as that obtained from a thermal type air flow meter having a fast response characteristic, by performing the inverse-transformation (step 251). Then, it becomes possible to prevent a decrease in the detected air flow by linearizing the above signal when the air flow is obtained. Further, by subtracting the backward flow obtained using backward flow determining means from the forward flow in the signal obtained after the linearization, it is also possible to prevent an increase of the detected air flow.

Figure 1:
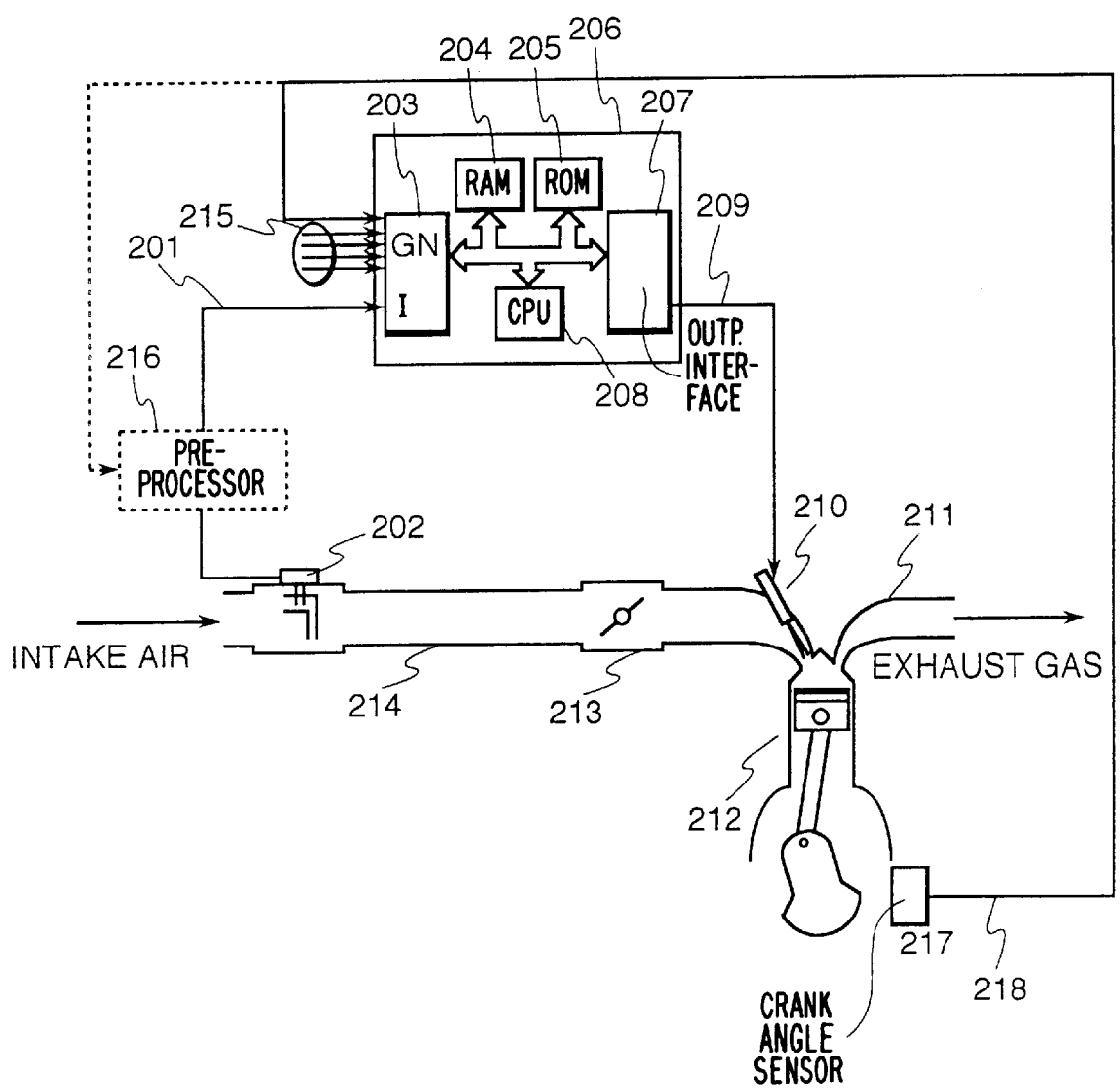
FIG. 1 is a schematic diagram of an air flow measuring apparatus according to the present invention.
Figure 4:
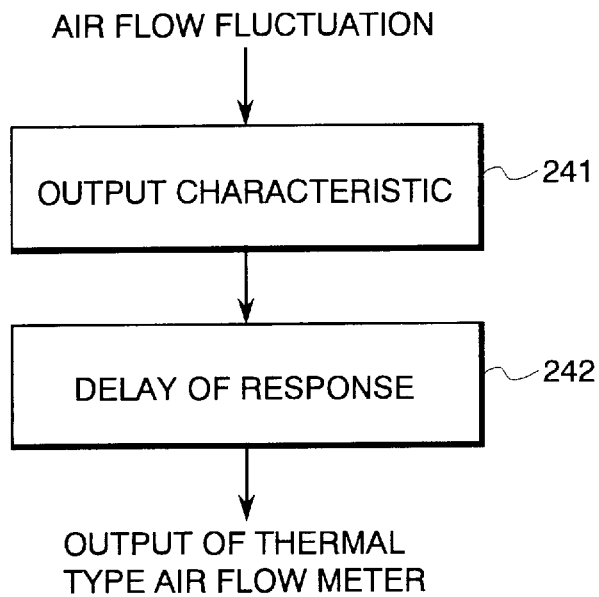
FIG. 4 is a flow chart of the processing of a thermal type air flow meter used in an embodiment of the present invention.

Next, the processing of signals in an embodiment of the present invention will be explained with reference to FIGS. 1, 2, 6, and 7. FIG. 1 is a schematic view of an air flow measuring apparatus according to the present invention, and FIG. 2 is a graph showing the relationship between the average air flow obtained by inverse-transformation and the actual average air flow measured under conditions in which the load of the internal combustion engine is varying and the rotational speed thereof is constant. Further, FIG. 6 is a flow chart of the signal processing in an embodiment of the present invention, and FIG. 7 is a graph showing the relationship between air flow and time constants.

In FIG. 1, the air flowing into an engine 212 passes through an air cleaner (not shown). Then, after the air flow is measured by a thermal type air flow meter 202, the air passes through an air intake pipe 214 and a throttle valve assembly 213. After that, the air is mixed with fuel supplied from an injector 210, and the air/fuel mixture is supplied to an engine 212. After the air/fuel mixture is burned in the engine 212, it is emitted through an exhaust pipe 211 to the atmosphere. An engine control unit (hereinafter referred to as an ECU) receives various auxiliary signals, such as a signal 218 from an crank angle sensor 217 and various signals 215 to monitor conditions of operation of the engine, such as an air/fuel sensor signal, etc. In the ECU, the amount of fuel injection from the injector 210 is set to obtain the optimum condition of engine operation, for example, as needed in a lean-burn engine.

The ECU 206 mainly comprises an input interface 203, a RAM 204, a ROM 205, a CPU 208 and an output interface 207. Signals input to the ECU 206 are arithmetically processed and supplied from the output interface 207 to various actuators as control signals. In FIG. 1, only one signal 209 supplied to injector 210 is shown as an example. While the arithmetic processing of the air flow is performed within the ECU in this embodiment, it should be appreciated that all of the processing shown in FIGS. 9, 11 and 12 can be performed in the thermal type air flow meter 202 itself or in a pre-processor 216. Further, it should be appreciated that the thermal type air flow meter 202 or the pre-processor 216 can take charge of a part of the processing. In the case where the pre-processor 216 performs the processing, it is necessary to input at a minimum a signal from the thermal type air flow meter 202 to the pre-processor 216.

Figure 6:
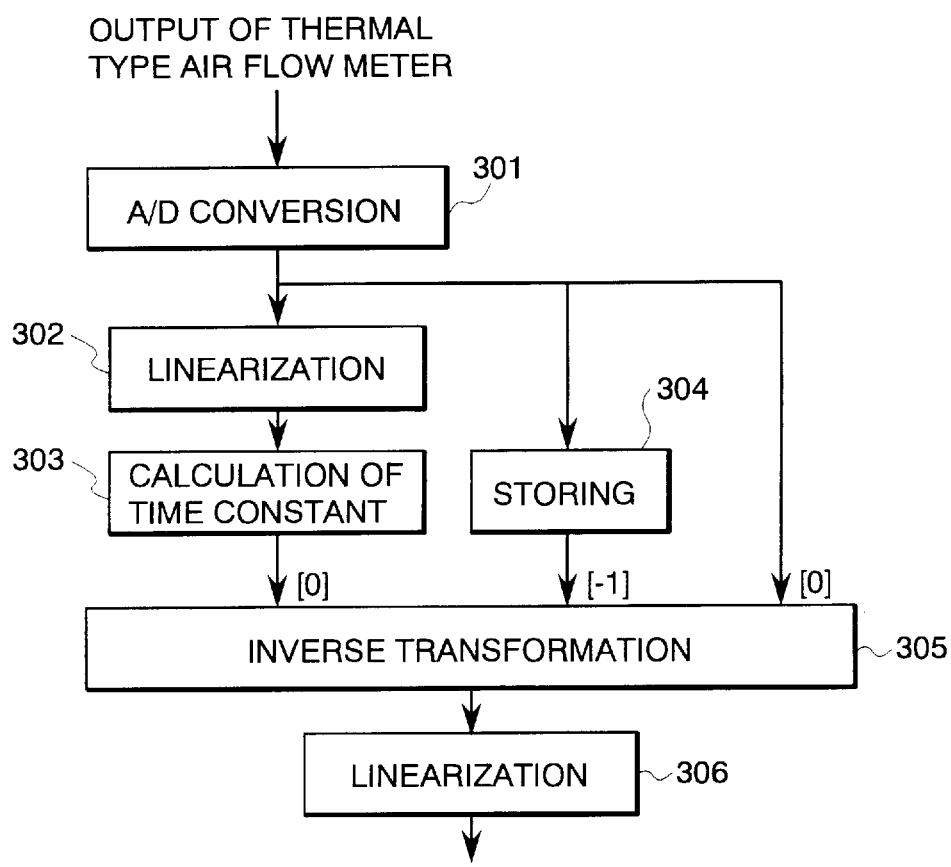
FIG. 6 is a flow chart of the signal processing in an embodiment of the present invention.
Figure 7:
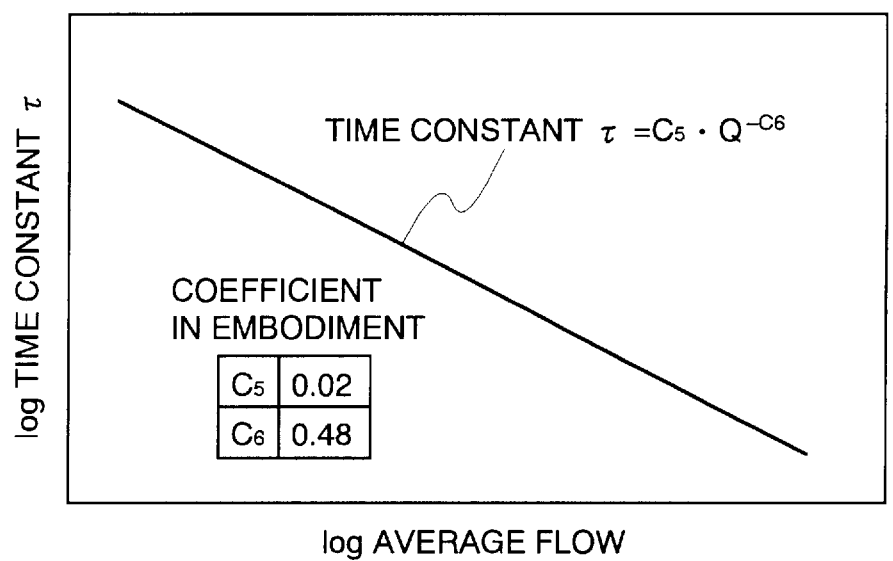
FIG. 7 is a graph showing the relationship between air flow and time constants.

In FIG. 6, an output signal of the thermal type air flow meter is sampled in a period T and converted into a digital signal (step 301). Next, the time constant τ is calculated (step 303) by using equation (1) to perform the inverse-transformation (step 305) for compensating the response of the sensor. Namely, A/D converted values are converted temporarily into a value of air flow Q by the linearizer (step 302), and the time constant τ is obtained by the following equation.

$$\tau = C_5 \cdot Q - C_6 \tag{1}$$

Where, $C_5$ and $C_6$ are constants, and $C_5=0.02$ and $C_6=0.48$.

As described in the aforementioned Document 3, a thermal element of the thermal type air flow meter emits an larger amount of heat when the air flow is larger. It is, therefore, easy to obtain a heat balance. Accordingly, the air flow meter exhibits a characteristic of air flow dependence in which the larger the air flow, the smaller the time constant τ is, as shown in FIG. 7. While in this embodiment the time constant τ is calculated by using the air flow signal having a delay with respect to the pulsating flow of the engine, the average air flow can be obtained with a sufficient accuracy.

By inserting the time constant $\tau$ (step 303), the period T for the A/D conversion, the value $V_0$ of the current A/D conversion and the value $V_{-1}$ of the previous A/D conversion (step 304) into the following equation (2), the inverse-transformation (step 305) expressed in the equation (2) is performed to compensate the response.

$$V_{INV} = \frac{1}{2}[V_0 + V_{-1}] + \frac{\tau}{T}[V_0 - V_{-1}] \qquad (2)$$

Here, the output characteristic of $V_{INV}$ is non-linear. Therefore, the air flow is obtained after being linearized by the linearizer (step 306).

Figure 8:
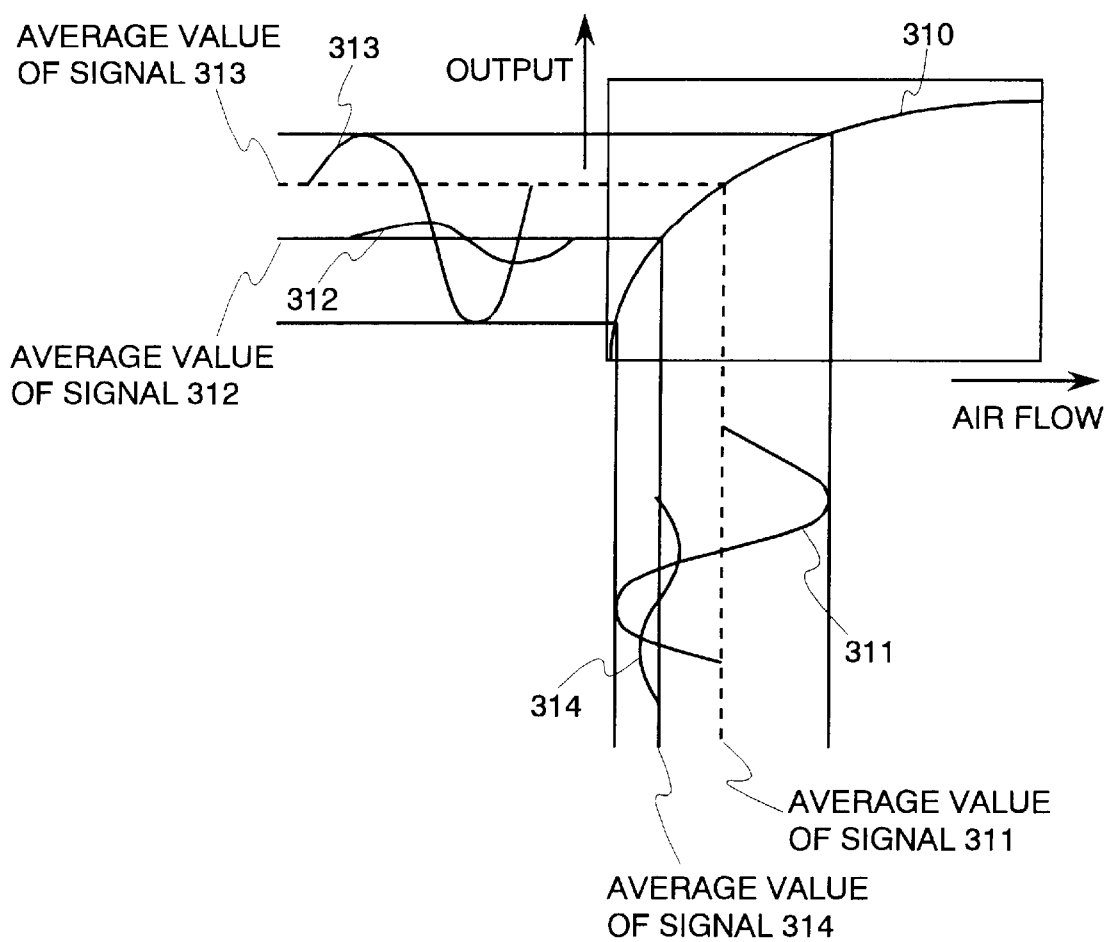
FIG. 8 is a diagram illustrating the principal of a method of obtaining the actual air flow.

Next, referring to FIG. 8, the principle of the present invention to obtain an actual air flow signal will be explained. FIG. 8 shows a curved line 310 representing a conversion-characteristic of the linearizer to compensate the non-linear characteristic of the input/output signals of the thermal type air flow meter 202 used in the air flow measuring apparatus according to the present invention, a curve 311 showing variation of the actual intake air flow, an output signal 312 of the thermal type air flow meter 202, an output signal 313 of the thermal type air flow meter having no delay of response, an output signal 314 of the linearizer obtained by passing the output of the thermal type air flow meter 202 as it is through the linearizer, and the average value of-each of the above signals.

By performing the linearization as shown by the characteristic 310 on a non-linear output 313 of an ideal thermal type air flow meter having no delay of response, a signal indicative of the actual air flow 311 can be obtained. However, if the output signal 312 of the actual thermal type air flow meter having the delay in time of response is linearization-processed as it is, the output signal 314 is obtained. Its phase, its amplitude and its average value are different from those of the actual air flow signal 311. As a result, an error in measurement occurs.

On the other hand, in the air flow measuring apparatus according to the present invention, an inverse-transformation is performed to compensate the delay in time of response before the output signal 312 of the thermal type air flow meter 202 is linearization-processed. Therefore, it is possible to obtain a signal with the same amplitude and phase as the output signal 312 having no delay in time of response. It is, further, possible to obtain the actual air flow signal 311, because linearization expressed by the characteristic 310 is performed on the inverse-transformed signal.

Figure 9:
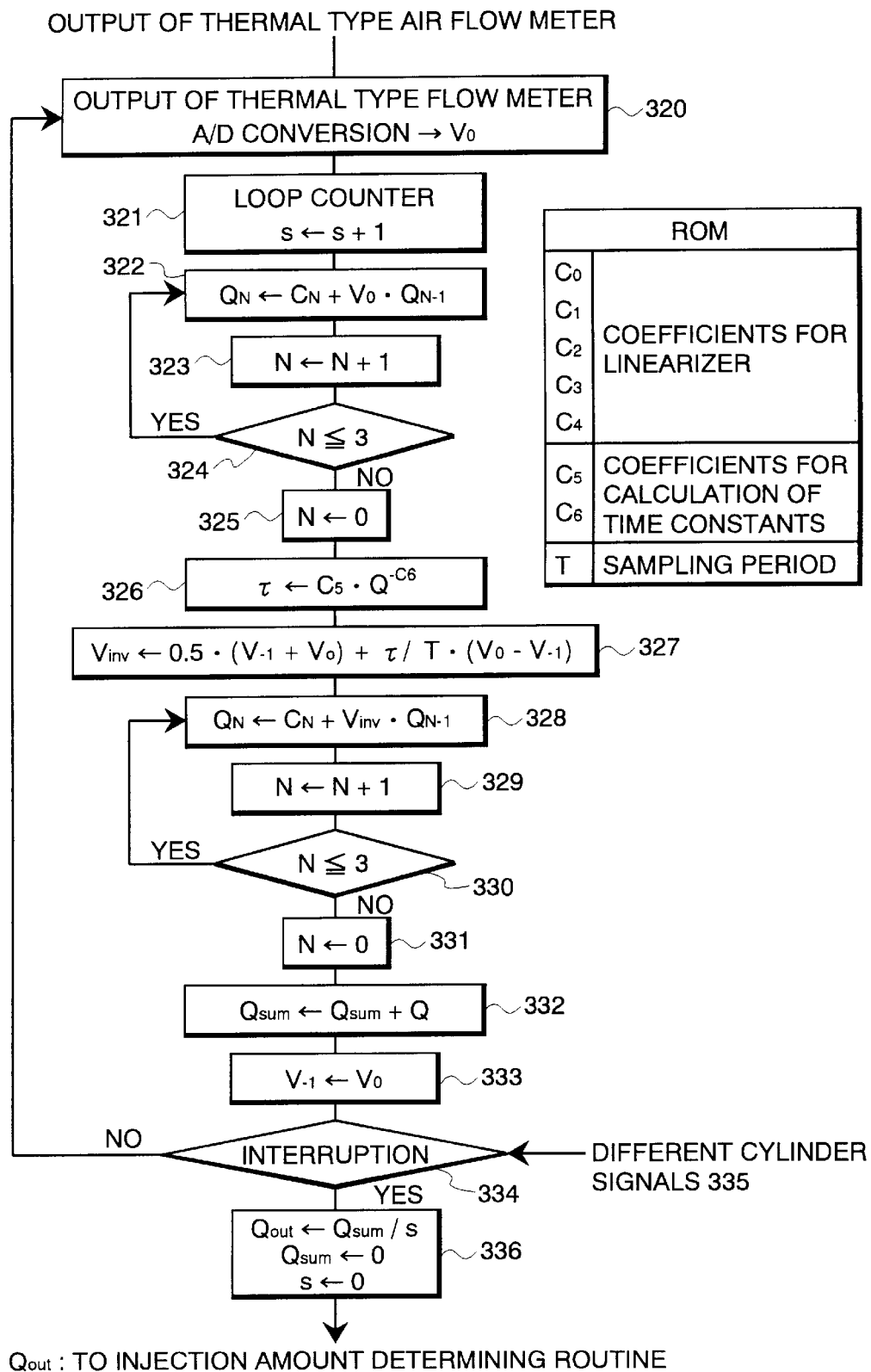
FIG. 9 is a detailed flow chart of the signal processing in an embodiment of the present invention.

Further detailed processing will be explained with reference to FIG. 9. Firstly, to digitalize an output of the thermal type air flow meter, the output is A/D-converted in step 320 and stored in the RAM 204 as a variable $V_0$. It should be appreciated that the period T of the A/D conversion can be set as a predetermined constant time or a predetermined crank angle. If the A/D conversion is performed at every determined crank angle, it is necessary to measure individually the period T of the A/D conversion by using a clock signal. If the A/D conversion is performed at every predetermined time, it is desirable to set the predetermined time between 0.1 ms and 2 ms. If the A/D conversion is performed at every predetermined crank angle, it is desirable to set the predetermined crank angle between 0.6° and 12°. When the A/D conversion is performed every 1 ms, an error of a maximum of 3% is produced with respect to the actual air flow.

Because it is necessary to obtain an air flow value for each cylinder to determine an amount of fuel injection, there is provided a loop counter (step 321) as means for calculating the number of the A/D conversions until an interruption signal (step 334) is provided for every cylinder. The number of the count is set to s. If the period for conversion is set by using the crank angle, this step is not used. Steps 322 to 324 correspond to the step 302 of FIG. 6 in which the linearization is performed by the linearizer. The air flow is generally obtained by using the following fourth order equation (3), when the linearization is performed.

$$Q = C_0 + C_1 \cdot V_0 + C_2 \cdot V_0^2 + C_3 \cdot V_0^3 + C_4 \cdot V_0^4 \qquad (3)$$

where, a coefficient $C_N$ is obtained from the relationship between the air flow Q and the output V in a steady state, and stored in a ROM 205 in advance. Further, a repetition factor $Q_N$ suitable to the calculation of the equation (5) is picked up by modifying the above equation (3) like the equation (4).

$$Q = C_0 + V_0(C_1 + V_0(C_2 + V_0(C_3 + C_4 \cdot V_0^4))) \qquad (4)$$

$$Q_N = C_N + V_0 Q_{N-1} \qquad (5)$$

At step 322, a coefficient $C_N$ is added to the production of the A/D converted value V and the repetition factor $Q_{N}-1$ Where, N is a repetition number which is incremented from an initial value 0 by the counter (step 323), and the coefficient $C_N$ is obtained from data stored in the ROM 205 by using the number N of the count as a reference value for an address. The repetition factor $Q_N$ is stored in the RAM 204. If it is determined that the number N of the count is less than 4 (step 324), the processing branches back to the step 322, and steps 322 to 324 are repeated.

Although, in this embodiment, the repetition number is set to 4 because it is easy to calculate a fourth order equation in the linearization process, the number of coefficients and the number of repetitions may be changed in accordance with the capacity of the CPU 208 to effect the necessary calculation. Further, a map may be used to improve the accuracy of the linearization. In such a case, it is necessary to increase the capacity of the ROM 205.

If the repetition calculation is performed and $N \geq 4$ at step 324, N is set back to the initial value 0 in step 325. At step 326, the time constant $\tau$ is obtained according to the equation (1), and stored in the RAM 204. Next, an inverse-transformation to compensate the response is performed according to the equation (2) at step 327. Here, the time constant $\tau$, the period T, and the value V of the A/D conversion are read out of the RAM 204 which stores these values in advance. The inverse-transformed value $V_{INV}$ obtained is stored in the RAM 204. After that, the time constant $\tau$ stored in the RAM 204 can be cleared.

Next, the inverse-transformed value $V_{INV}$ is linearized at steps 328 to 331. These steps are the same as steps 322 to 325. Namely, these steps follow the same routine of a computer program as steps 322 to 325, and both addresses also are the same. The value Q obtained by the linearization is added to $Q_{SUM}$, the previous sum. At step 333, the value $V_0$ of the A/D conversion is stored as V-1 in a memory. The above process is repeated, for example, until the reference signal of the crank sensor is provided as an interruption signal. When the interruption signal is provided, the process goes out of the repetition loop at step 334. Then, at step 336, the sum $Q_{SUM}$ of Q is divided by the number s of the count of the loop counter, and the average air flow $Q_{OUT}$ is obtained. At the same time, the sum $Q_{SUM}$ and the number s of count of the loop counter are reset to the initial value 0.

The average air flow $Q_{OUT}$ is provided to a routine to determine an amount of fuel injection and is multiplied by a coefficient for correction corresponding to the environment in which the engine is operated, on the basis of information provided from signals 215 of various sensors for monitoring the engine. After the amount of the fuel injection is determined, a signal 209 indicative of the amount of the fuel injection is provided from the output interface 207 to the injector 210.

Figure 10:
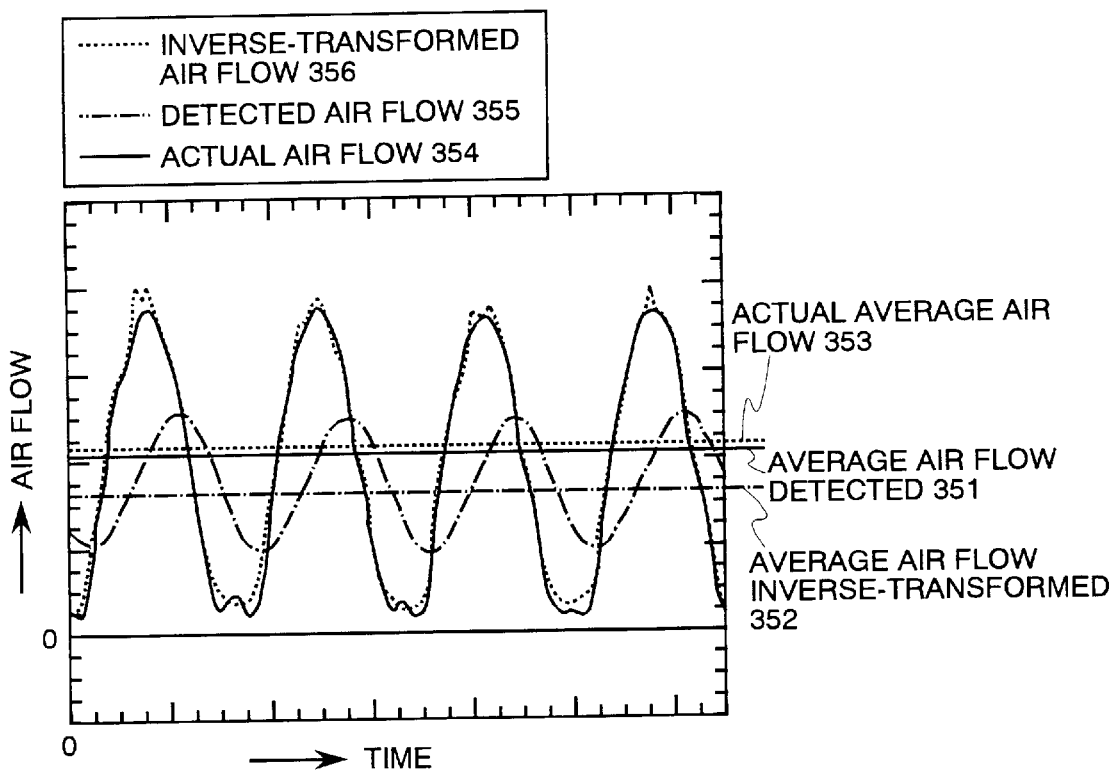
FIG. 10 is a graph showing the waveform of an air flow signal obtained by inverse-transformation in an example of the present invention.

FIG. 10 shows an example of the waveform provided in the actual processing. The prior art waveform 355 of the detected air flow has a delay in the time of response with respect to the waveform 354 which represents the actual pulsating flow, and the average air flow detected 352 becomes smaller than the actual averaged air flow 351. The inverse-transformed waveform 356 of the air flow represents the waveform of the inverse-transformed output after performing the above processing on the waveform 355 of the detected air flow. A fluctuation in the waveform due to noise appears near the peak of the pulsating flow, but it is clear that the inverse-transformed waveform follows the actual air flow. The average air flow 353 ($Q_{OUT}$) of the inverse-transformed output is close to the actual average air flow 351 under the conditions where a backward flow does not occur. Namely, the problem wherein the value of the detected air flow becomes smaller than that of the actual average air flow was substantially eliminated in this embodiment.

Figure 11:
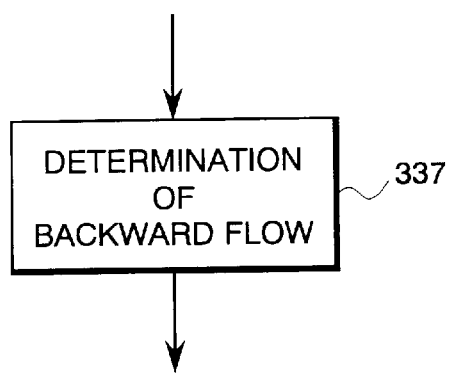
FIG. 11 is a flow chart of the processing for detecting backward flow.

In the obtained average air flow $Q_{OUT}$, the problem that the detected air flow decreases was substantially eliminated as shown by the curve 221 in FIG. 2, which shows that it follows the actual air flow over a wide range. Namely, under a large load, the air flow 222 at each time during the backward flow substantially indicates the values plotted along the actual curve except during the backward flow, while the absolute value of air flow at each time during the backward flow also substantially indicates the values plotted along the actual curve. Therefore, the average air flow is larger than the actual air flow, because the absolute values are substantially equal to each other, but the signs are different from each other. This suits the actual characteristics of an engine in which extra fuel is consumed in a large load. If it is necessary to control the air flow with a greater precision also at the time of a large load, it is desirable that step 337 is inserted between the steps 331 and 332, for determining the backward flow in an air intake duct, as shown in FIG. 11. The curve 225 in FIG. 2 is obtained by determining the presence or absence of the backward flow and correcting the measured air flow by an amount of the backward flow. Therefore, the detected air flow is closely analogous to the actual air flow even in a region where the backward flow occurs. It should be appreciated that an air flow map stored in advance in the ROM can be used, from which a value of the air flow is accessed by using the A/D converted value V and the inverse-transformed value $V_{INV}$ in the steps 322 to 324 and steps 328 to 330.

Now, a specific method of avoiding an increase in the detected air flow due to a backward air flow by determining when the backward flow occurs will be explained hereinafter. This method is used for the signal that is inverse-transformed, linearized, and then converted into the measured air flow amount. In particular, this method represents an improvement of the above method, in which the step 332 in the above method is eliminated and the backward determining step 337 shown in FIG. 11 is added after the step 333. Therefore, a characteristic different from that of FIG. 3 can be obtained according to this method.

Figure 12:
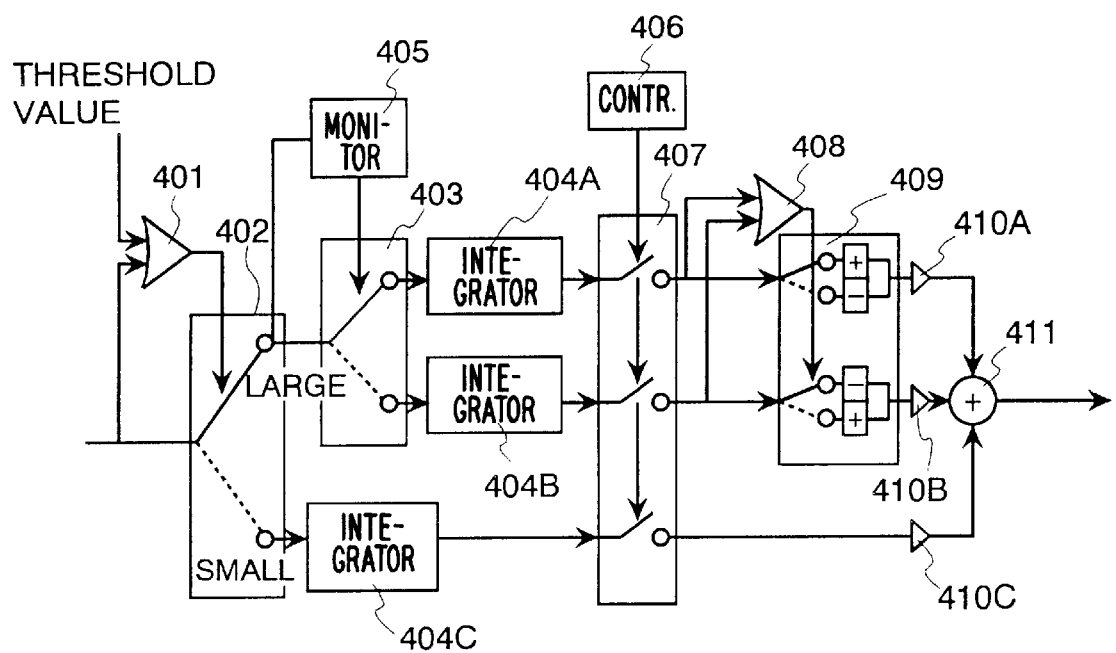
FIG. 12 is a block diagram of backward flow determining means in an embodiment of the present invention.

The determination of the backward flow will be explained in detail with reference to FIG. 12. A comparator 401 operates to compare the value of an output from the linearizer with a predetermined threshold value. In this example, when the rate of flow in the thermal type air flow meter is at 1 m/s, the air flow at this time is set as the predetermined threshold value. The comparator 401 has the function of switching the direction of an output signal of the linearizer using a switching circuit 402. If an input value of the output of the comparator 401 is smaller than the predetermined threshold value, then the output of the switching circuit 402 is supplied to a circuit 404c, where it is integrated and stored.

If the input value of the comparator 401 is larger than the predetermined threshold value, then the output signal of the linearizer is supplied in parallel to switching circuit 403 and circuit 405 via the switching circuit 402. The circuit 405 constantly monitors the output of the switching circuit 402. When the direction of the output signal of the linearizer is switched from the circuit 404c to the switching circuit 403 by the switch 402, the direction of switching in the switch 403 is changed at the same time. As a result, if the output continuously represents values greater than the threshold value, then the values are continuously supplied to circuits 404A or 404B depending on the state of switching circuit 403, which is controlled so that its output can be switched in the direction of the circuit 404A at a first time. However, the next time the output of the linearizer takes a value lower than the predetermined threshold value and then takes a value larger than the predetermined threshold value again, the switching circuit 403 changes the switching direction to the circuit 404B.

Those operations are alternately repeated. The period during which the output continuously takes a value greater than the threshold value is defined as one period. The odd period from the start is switched to the circuit 404A, and the even period is switched to the circuit 404B. In both the circuits 404A and 404B, the respective input values are integrated.

Control element 406 operates to monitor a reference signal (a cylinder signal) of a crank angle sensor. If the reference signal is not detected, then the process returns the process of A/D conversion. If the reference signal is detected, then a switch 407 is closed, and values provided by the integrator circuits 404A, 404B and 404C are transmitted to the next stage. As a result, the contents of the integrator circuits 404A, 404B and 404C are cleared. If a counter is used in the step 321 of FIG. 9 in this case, the counter is reset. In a comparator 408, values received from the integrator circuits 404A and 404B are compared with each other, and a direction of switching of circuit 409 is controlled according to the compared result.

In the circuit 409, either a positive (+) or a negative (−) sign is exclusively added to values supplied from the integrator circuits 404A and 404B. Namely, one of the values becomes positive (+), and the other becomes negative (−). In more detail, the block 408 is switched so that the positive sign (+) can be added to the larger value and the sign negative (−) added to the smaller value.

In an adder 411, two output values from the circuit 409 and an output value from the integrator circuit 404C are added, and the sum is output. A value of the sum equals a value of the air flow integrated until the next reference signal is input after a reference signal of the crank angle sensor is input. The resultant value can be supplied directly to a calculating stage for determining an amount of fuel injection. It is possible to obtain the average air flow by providing a counter at a stage upstream of the block 402 and dividing the output of the adder 411 by the number of the counter. While, in this embodiment, a reference signal of the crank angle sensor is used to perform the switching in switching circuit 407, a signal having a time interval greater than one pulsating period may used instead of the reference signal. For example, it is possible to use a signal having an ignition interval during which all the cylinders of an internal combustion engine can be ignited, or a signal having an interval corresponding to ignition intervals for several cylinders.

In the case where a thermal element of a bypass type air flow meter measures not main air flow, but bypass air flow, there is the fear that the ratio of the forward flow and the backward flow will be different due to the effect of a fluid element for the bypass. In such a case, the signals can be multiplied by coefficients for correction corresponding to the above ratio in correction circuits 410A, 410B and 410C.

Figure 13:
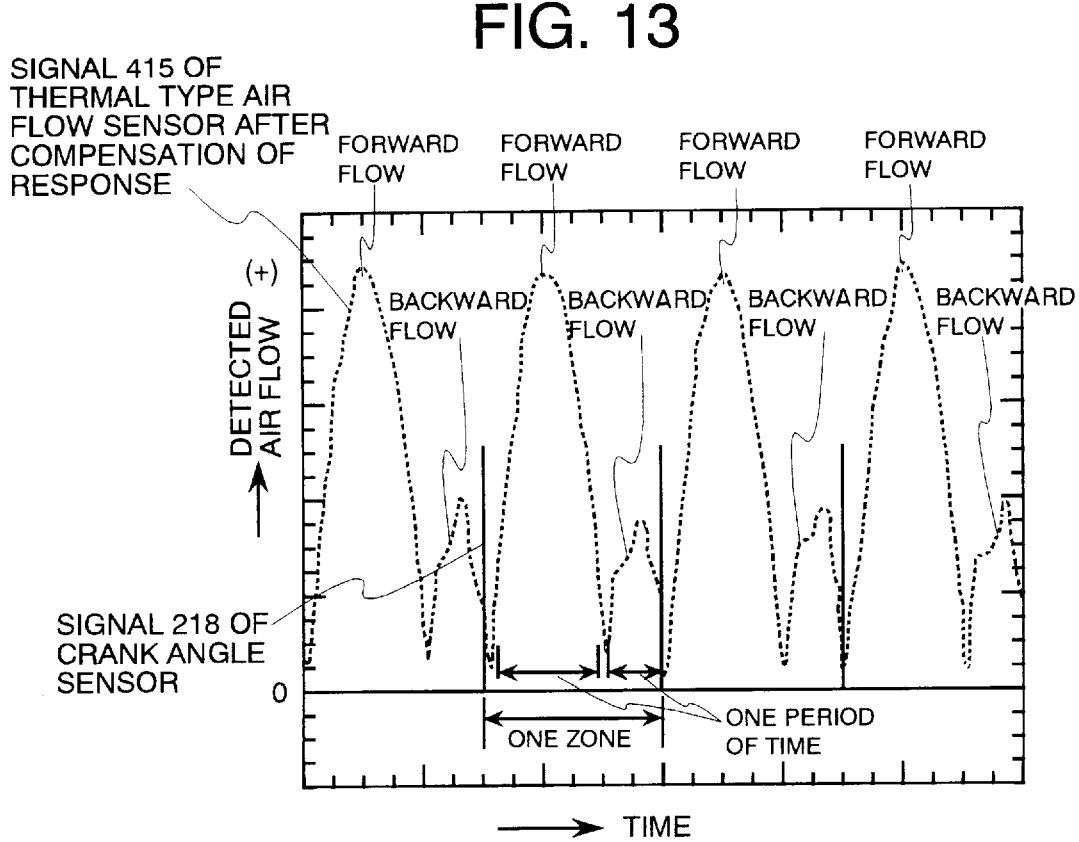
FIG. 13 is a graph showing the waveform of an air flow signal which has been inverse-transformed when a backward flow is generated.

FIG. 13 shows an example of the wave form of an air flow signal during backward flow when a 4-cylinder engine is operated at a low speed and in a region of large load. Reference numeral 415 designates waveform obtained after the inverse-transformation was performed on the detected waveform. Larger peaks designate the forward flow into the engine, and smaller peaks the backward flow. While the smaller peaks should be output as a negative flow, both the larger and the smaller peaks typically are output as a forward flow, because the thermal type air flow meter can not determine the direction of flow. The above-mentioned method of the present invention is directed to this problem.

Figure 14:
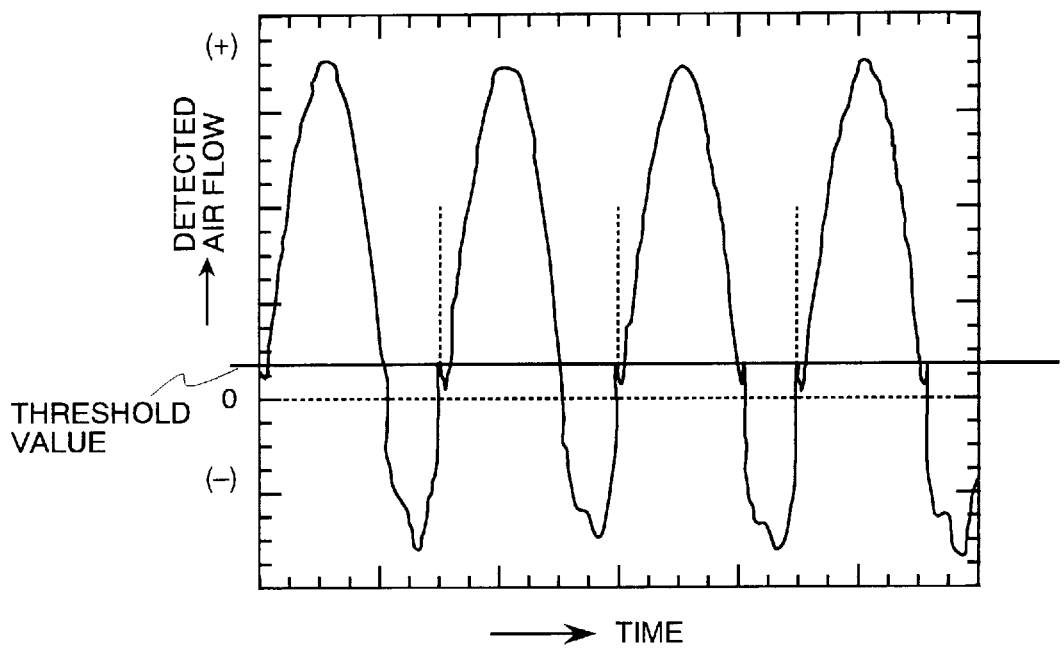
FIG. 14 is a graph showing the waveform obtained after inverse-transformation and a determination of the backward flow has been performed.

According to the above method, the instantaneous flow is not output; rather, the result of integration of each of the peaks is output. In order to verify this, A/D converted values are stored sequentially with time, and data input to the adder 411 is developed at every time. The result is shown in FIG. 14. As seen from FIG. 14, the larger peaks above the threshold value can be determined as the forward flow, and the smaller peaks below the threshold value as the backward flow. A line drawn by re-plotting the average air flow from the above output signal overlaps a solid line 225 shown in FIG. 2. Namely, the line is closely analogous to the actual characteristic shown by the dotted line.

Figure 15:
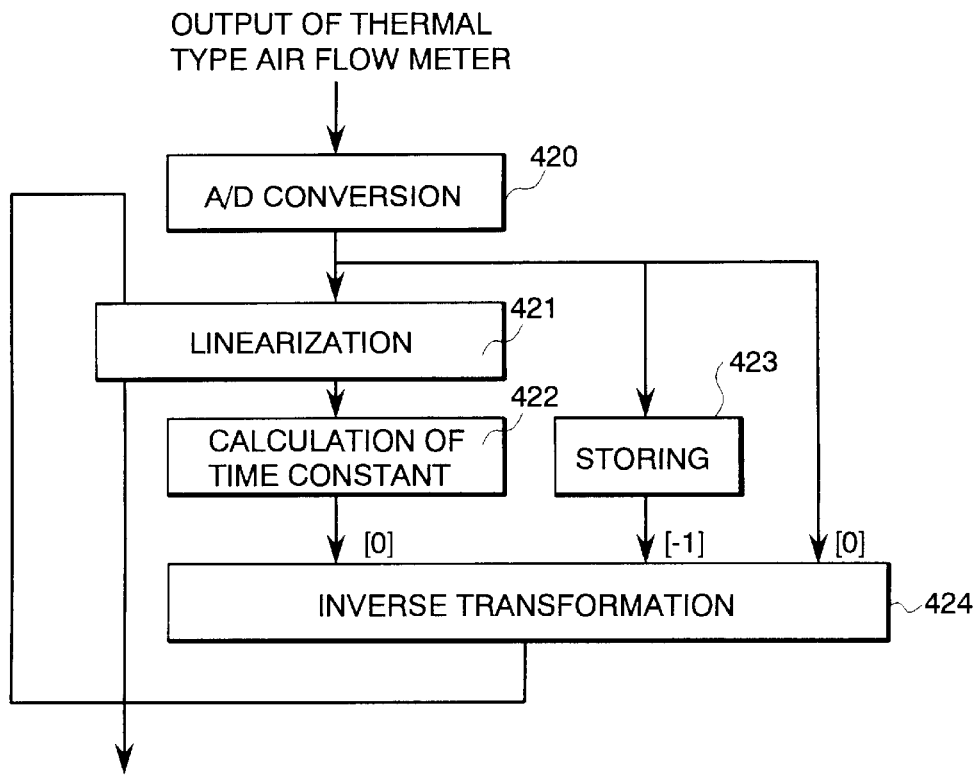
FIG. 15 is a flow chart of the processing in another embodiment of the present invention.

The process in another embodiment of the present invention will be described with reference to FIG. 15. In this embodiment, the output of the thermal type air flow meter is A/D converted at a period T (step 420) to produce a digital output. Next, the time constant τ is obtained to perform the inverse-transformation (step 424) for compensating the time response. Namely, the A/D converted value is temporarily converted into air flow by the linearizer (step 421), and then the time constant τ is calculated according to the equation (1) at step 422. While, in this case, the time constant τ is calculated from an air flow signal having a delay with respect to the pulsating flow of the engine, it is possible to obtain a time constant τ with an accuracy sufficient to calculate the average air flow. By using the time constant τ, the period T of the A/D conversion, the previously A/D converted value ($V_{-1}$) stored in a memory (step 423) and the currently A/D converted value ($V_0$), the inverse-transformation (step 424) to compensate the response is performed according to the equation (2). Because $V_{INV}$ is nonlinear, the signal must be linearized again by a linearizer (step 421). Thereby the actual air flow can be obtained. As compared with the previous embodiment, the present embodiment can be realized using only one linearizer. Therefore, the capacity of the memory can be decreased.

Figure 16:
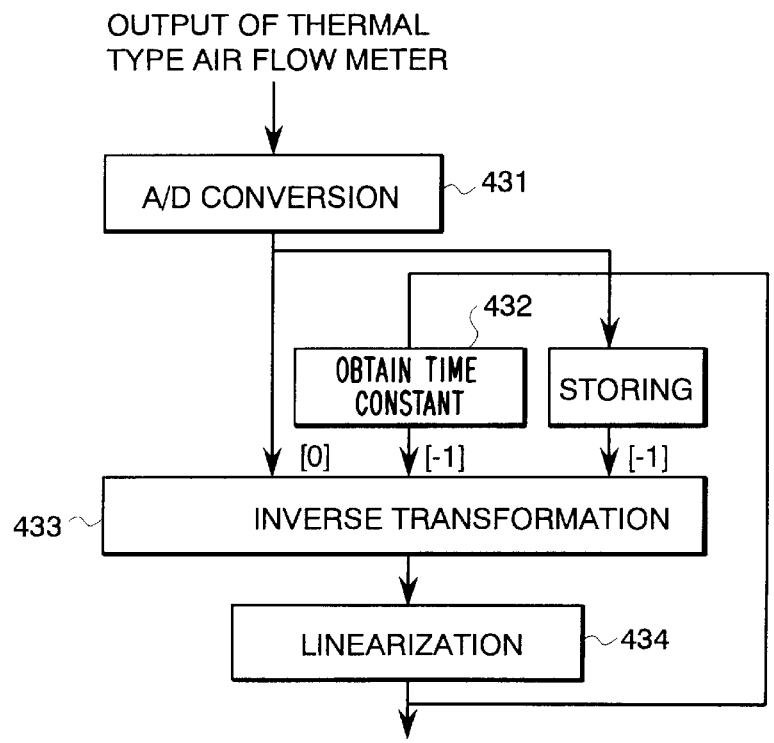
FIG. 16 is a flow chart of the processing in a modified example of the present invention.

FIG. 16 shows the process in a modified example of the above embodiment. In this embodiment, the signal of a thermal type air flow meter is firstly A/D converted (step 431), after which the A/D converted signal is inverse-transformed. It should be noted that the signal which has been inverse-transformed is a non-linear signal received from a thermal type air flow meter, and so the non-linear signal is input to a linearizer after the inverse-transformation is performed, thereby obtaining the actual air flow signal (step 434). A constant corresponding to the time constant, used when the inverse-transformation is performed, is obtained by performing a feedback of the air flow signal obtained from the linearizer to the step 432. The present modification has the same effects as the embodiment shown in FIG. 16. Further, as compared with the embodiment shown in FIG. 16, because the feedback of the result of the processing is performed, the precision of the time constant is improved, and thus a more accurate control can be performed.

Figure 17:
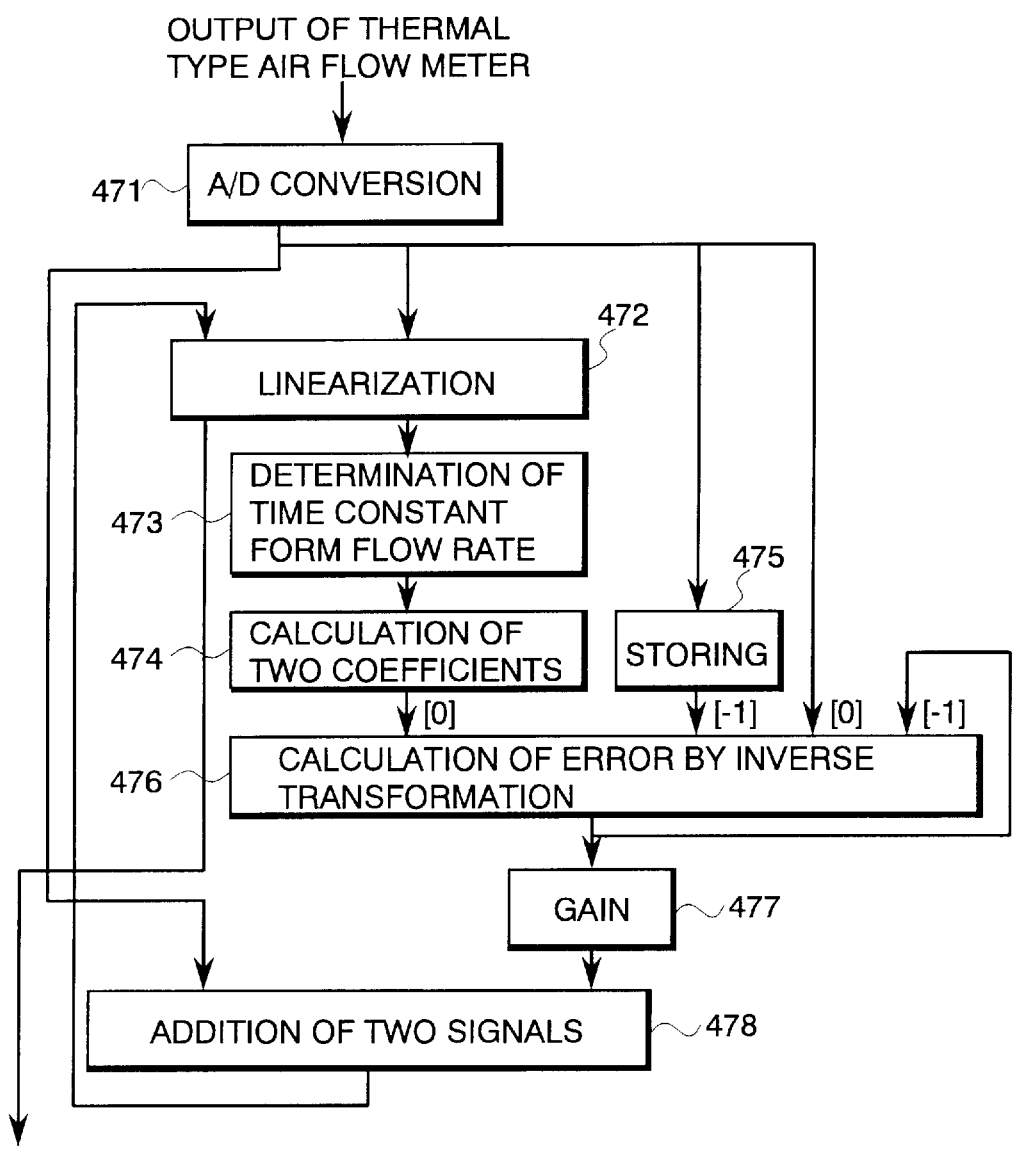
FIG. 17 is a flow chart of the processing in another modified example of the present invention.

FIG. 17 shows the process in another modified example of the present invention. In this modification, the A/D converted signal is supplied to two paths. In one path, the inverse-transformation is performed to obtain an error from the output corresponding to the actual air flow. The inverse-transformed signal is added to an output of the other path at the final step 478, and a non-linear output corresponding to the actual air flow is obtained. After this, the output is returned to the linearizer to convert it into the actual air flow.

The way to obtain the error will be explained. The A/D converted value is input to the linearizer and linearized (step 472). At the next step 473, the time constant is obtained, which is expressed as a function of the air flow. Two coefficients relevant to the period of the A/D conversion and the time constant are determined at step 474. While at this time the time constant τ is calculated using the air flow signal having a delay with respect to the pulsating flow of the engine, there is sufficient accuracy to calculate the average air flow. Also, the A/D converted value is stored in a memory (step 475). When the inverse-transformation is performed to obtain an error for the output corresponding to the actual air flow, the two coefficients, the previously A/D converted value stored in memory, the currently A/D converted value and the previously obtained error are used. The obtained error is multiplied by a gain (step 477), and a non-linear signal corresponding to the actual air flow is obtained by adding the product to the A/D converted value produced at step 471. After that, the output is returned to the linearizer to convert it into the actual air flow. According to the present modification, as compared with the embodiments shown in FIGS. 15 and 16, a more stable control is performed because the time constant is obtained from the signal with delay.

Figure 18:
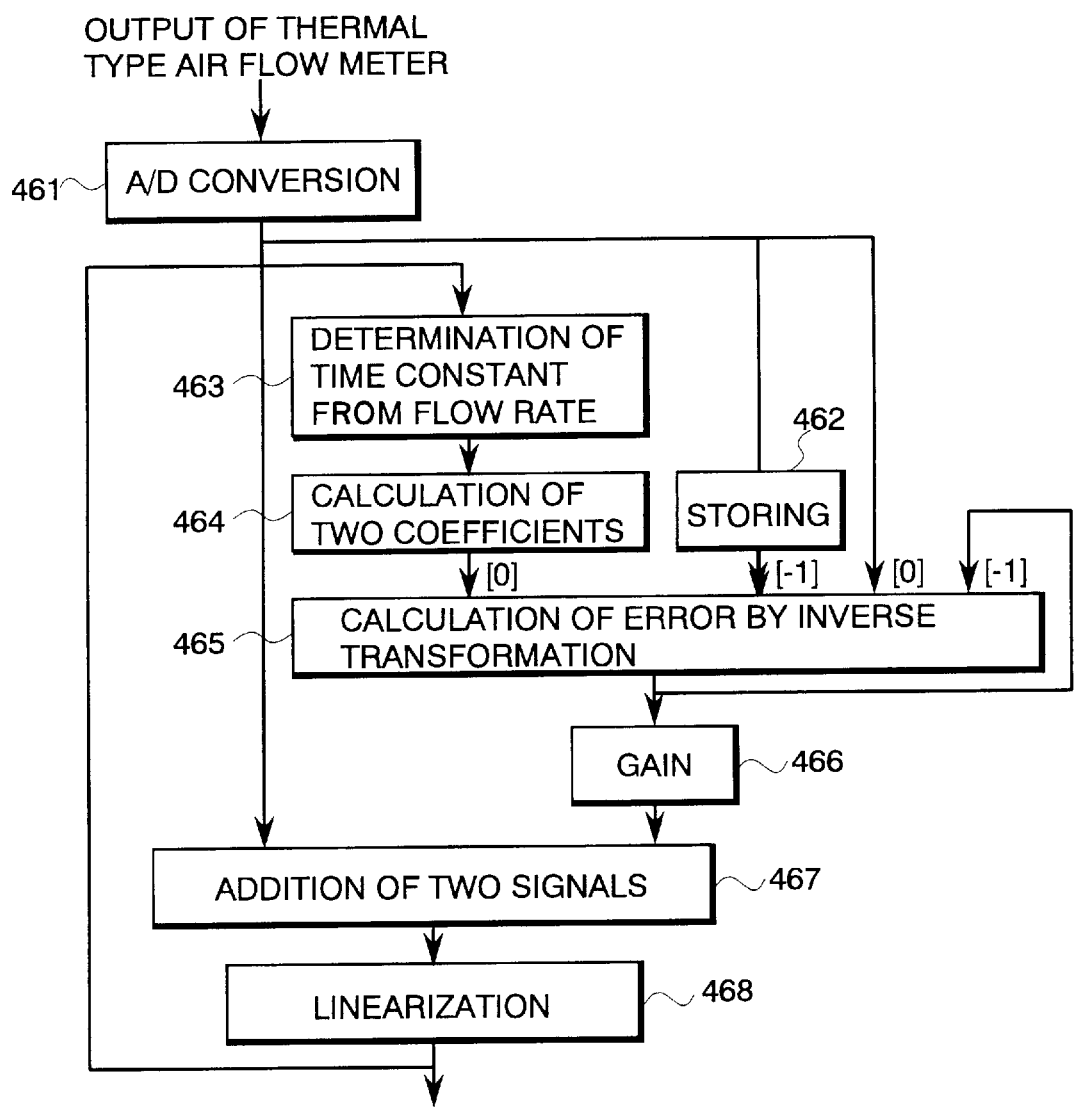
FIG. 18 is a flow chart of the processing in a further modified example of the present invention.

A process in a further modified example of the present invention is shown in FIG. 18. In this modification, the A/D converted signal (step 461) again is supplied to two paths. In one path, inverse-transformation is performed to obtain an error from the output corresponding to the actual air flow. The inverse-transformed signal is added to an output of the other circuit at the final step 467, and a non-linear output corresponding to the actual air flow is obtained. After that, the output is linearized by the linearizer so as to be converted into the actual air flow (step 468).

The way to obtain the error will be explained hereinafter. The feedback of the linearized (step 468) signal is performed, after which the time constant is obtained at step 463, which is expressed as a function of the air flow. Two coefficients relevant to the period of the A/D conversion and the time constant are determined at step 464. Also, the A/D converted value is stored in a memory (step 462). When the inverse-transformation (step 465) is-performed, the two coefficients, the previously A/D converted value stored in memory, the currently A/D converted value and the previously obtained error are used. The obtained error is multiplied by a gain (step 466), and the non-linear signal corresponding to the actual air flow is obtained by adding the resulting product to the A/D converted value at step 467. After that, the actual air flow is obtained by the linearizer (step 468).

According to the present modification, in addition to the effects obtained by the embodiment shown in FIG. 17, it is easy to take steps against failure of the response compensating part, because the response compensating part is completely separated.

While in the above-mentioned embodiments, A/D conversion was performed every period T, it should be appreciated that the sampling can be performed every constant crank angle, for example, every 12°.

We claim:

1. An air flow measuring apparatus for measuring an amount of intake air flowing into an internal combustion engine by using an output signal of a thermal type air flow meter, comprising:

an A/D converter for sampling the output signal of said thermal type air flow meter and for producing a digital signal; and linearizing means in which a digital signal converted by the A/D converter passes to first and second circuits, the digital signal being inverse-transformed to obtain an error signal from an output signal corresponding to an actual air flow in the first circuit, a value of the inverse-transformed digital signal being added to a digital signal of the second circuit, and the resulting signal being converted into a signal with a value corresponding to an air flow on the basis of characteristics of the thermal type air flow meter stored in advance, further comprising backward air flow determining means for inputting an output signal of the linearizing means and for determining a backward flow of air.

2. An air flow measuring apparatus according to claim 1, wherein said backward air flow determining means, comprises:

first comparing means for comparing the signal having a value corresponding to the air flow with a predetermined value;

first and second integrating means for inputting and integrating the signal throughout a period of time during which the signal is continuously greater than the predetermined value;

switching means for switching alternately the time period for integration between the first and the second integrating means; and sign adding means for adding a negative sign to the smaller one of the outputs of the first and the second integrating means.

3. An air flow measuring apparatus according to claim 1, wherein said backward air flow determining means comprises:

first comparing means for comparing an output signal corresponding to an air flow obtained by the linearizing means with a predetermined threshold value;

plural integrating means for integrating and then storing an integrated value in accordance with an output signal from the first comparing means;

second comparing means for comparing output signals from two integrating means of said plural integrating means; and sign adding means for adding exclusively a positive or a negative sign to the output signals from said two integrating means in accordance with an output signal of the second comparing means.

4. An air flow measuring apparatus according to claim 3, further comprising first switching means for allowing an output signal of the first comparing means to be supplied to the same integrating means when the output signal of the first comparing means is continuously greater than a predetermined threshold value.

5. An air flow measuring apparatus according to claim 3, further comprising signal detecting means for detecting a signal in synchronization with rotation of a crank shaft of the engine, wherein the integrating time of said integrating means is set to an interval of the detected signal.

6. A method of measuring an amount of intake air flowing into an internal combustion engine by using an output signal of a thermal type air flow meter, comprising the steps of:

sampling the output signal of said thermal type air flow meter and producing a digital signal;

passing said digital signal to first and second circuits;

inverse-transforming the digital signal to obtain an error signal from an output signal corresponding to an actual air flow in the first circuit;

adding a value of the inverse-transformed digital signal to a digital signal of the second circuit;

converting the resulting signal into a linearized output signal with a value corresponding to an air flow on the basis of characteristics of the thermal type air flow meter stored in advance, and inputting the linearized output signal into a backward air flow determining means for determining a backward air flow.

7. An air flow measuring method according to claim 6, wherein the linearized output signals obtained in an odd period of time during a predetermined period of time and the linearized output signals obtained in an even period of time are integrated independently of each other, magnitudes of the integrated values are compared with each other, and the backward flow is determined by an output signal with a smaller value.

8. An air flow measuring method according to claim 7, further comprising a step of detecting a signal in synchronization with rotation of a crank shaft of the engine, wherein the integrating time is set to an interval of the detected signal.

9. An air flow measuring method according to claim 7, wherein the integrating time is set to a value between 0.1 ms and 2 ms.

10. An air flow measuring method according to claim 7, wherein the integrating time is set to a period of time during which a crank angle of the internal combustion engine shifts between 0.6 degree and 12 degree.

11. An air flow measuring method according to claim 6, wherein sampling is periodically performed, and wherein a period of the sampling is adjusted according to a rotational speed of the internal combustion engine.

12. An air flow measuring method according to claim 6, wherein in said step of determining the backward air flow, when a period, in which a value corresponding to an air flow amount derived on the basis of the sampling step, is maintained to be greater than or equal to a set value, is taken as one unit, a second period of said unit, in which said value is maintained greater than or equal to said set value, occurs following an immediately preceding first period of said unit and is indicative of an opposite direction of flow of the intake air to that of said first period for enabling determination of the backward flow of the intake air.

\* \* \* \* \*